United States Patent [19]

Silberstein

[11] Patent Number: 5,058,715

[45] Date of Patent: Oct. 22, 1991

[54] SHOCK ABSORBER

[76] Inventor: Ilan Silberstein, 28 Meadowhill Dr., Tiburon, Calif. 94920

[21] Appl. No.: 438,184

[22] Filed: Nov. 20, 1989

[30] Foreign Application Priority Data

Nov. 28, 1988 [IL] Israel .................................. 88523

[51] Int. Cl.⁵ ............................ F16F 9/49; F16F 9/46
[52] U.S. Cl. ...................................... 188/280; 188/299
[58] Field of Search ........... 188/280, 299, 319, 322.22, 188/322.15, 195; 137/517, 514.5, 538; 267/DIG. 1

[56] References Cited

U.S. PATENT DOCUMENTS

| | | | |
|---|---|---|---|
| 3,574,352 | 4/1971 | Elliott | 280/707 |
| 4,732,408 | 3/1988 | Ohlin | 188/319 X |
| 4,854,429 | 8/1989 | Casey | 188/319 X |
| 4,874,066 | 10/1989 | Silberstein | 188/280 |

FOREIGN PATENT DOCUMENTS

| | | | |
|---|---|---|---|
| 0266241 | 11/1987 | Japan | 188/322.22 |
| 0568770 | 8/1977 | U.S.S.R. | 188/280 |
| 691307 | 5/1953 | United Kingdom | 188/280 |

Primary Examiner—Robert J. Oberleitner
Attorney, Agent, or Firm—Thomas R. Lampe

[57] ABSTRACT

A shock absorber including a piston with two relatively movable elements defining a variable-sized, fluid-filled space in communication with a shock absorber chamber through a vent. The size of the space is decreased when subjected to external fluid pressure and fluid flow through the piston is modified in response to such decrease. The rate of space size decrease is controlled by means for selectively changing the effective size of the vent.

9 Claims, 1 Drawing Sheet

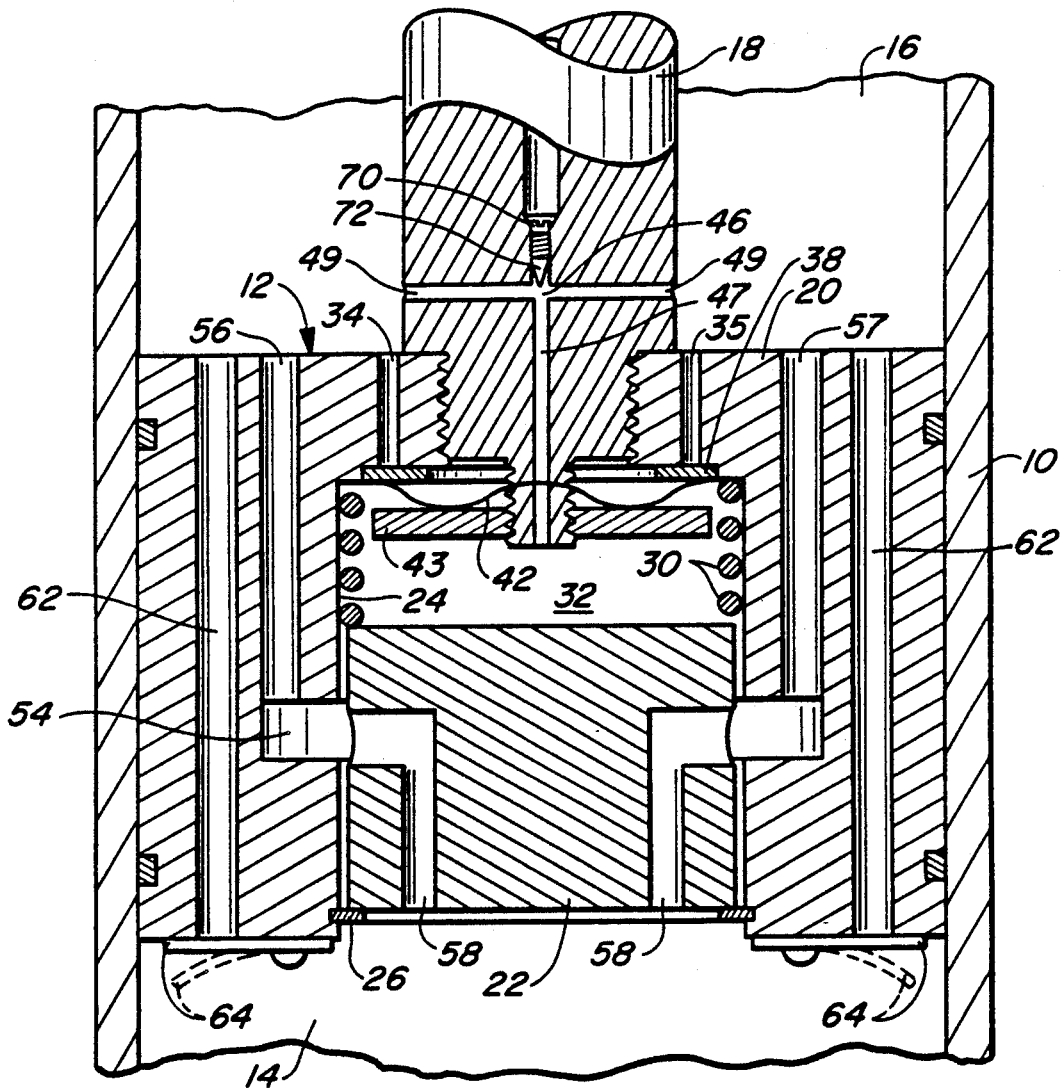
FIG._1
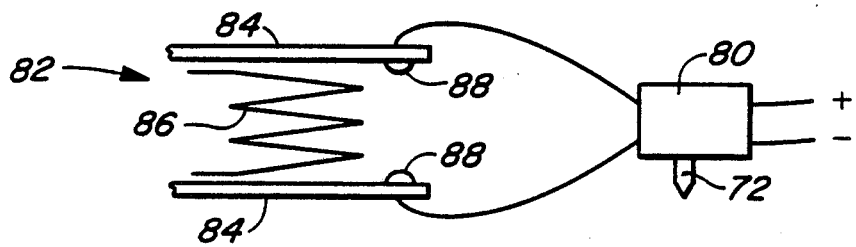
FIG._2

SHOCK ABSORBER

TECHNICAL FIELD

This invention relates to a shock absorber for use with motor vehicles and the like. The shock absorber has damping characteristics which vary in response to different road conditions and includes control means for selectively varying the rate of change of the damping characteristics of the shock absorber.

BACKGROUND ART

My U.S. Pat. No. 4,874,066, issued Oct. 17, 1989 relates to a shock absorber which provides variable damping when needed, independent of the positioning of the shock absorber piston in its associated cylinder.

More particularly, the piston disclosed in such patent defines first and second chambers in the cylinder and a primary passageway permitting the flow of fluid from the first chamber into the second chamber as fluid is pressurized in the first chamber by movement of the piston. The piston includes relatively movable first and second piston elements defining a variable-sized, fluid-filled space in communication with a chamber through a vent.

The second piston element is displaceable relative to the first piston element when pressure of the fluid in the first chamber increases to reduce the size of the space and force fluid from the space through the vent into the second chamber. The piston elements include means cooperable to change the effective size of the primary passageway substantially simultaneously with, and as a function of, reduction of the size of the space.

In the arrangement just described, the vent size remains the same. Thus, the rate of flow of fluid from the space to the second chamber is solely a function of the pressure of fluid in the space.

DISCLOSURE OF THE INVENTION

The present invention also relates to a shock absorber which provides variable damping when needed, independent of the positioning of the shock absorber piston in its associated cylinder.

In common with the device of my U.S. Pat. No. 4,874,066, the present shock absorber has a piston assembly including a piston rod and a piston connected to the piston rod. The piston is disposed in the cylinder to define first and second chambers in the cylinder and a primary passageway permitting the flow of fluid from the first chamber into the second chamber through the piston as fluid is pressurized in the first chamber by movement by the piston assembly.

The piston includes relatively moveable first and second piston elements defining a variable-sized, fluid-filled space and the piston assembly defines a vent providing fluid-flow communication between the space and the second chamber.

The second piston element is displaceable relative to the first piston element when the pressure of the fluid in the first chamber increases to reduce the size of the space and force fluid from the space through the vent into the second chamber. The piston elements include means for changing the effective size of the primary passageway simultaneously with, and as a function of, reduction of the space size.

The shock absorber constructed in accordance with the teachings of the present invention includes means for selectively changing the effective size of the vent interconnecting the space and the second chamber to control both the rate of fluid flow through the vent and the rate of space size reduction whereby the rate of change of the damping characteristics of the shock absorber can be selectively varied. This greatly contributes to the flexibility and adaptability of the shock absorber to a variety of operating conditions and environments.

Other features, advantages, and objects of the present invention will become apparent with reference to the following detailed description and accompanied drawings.

BRIEF DESCRIPTION OF THE DRAWINGS

FIG. 1 is a cross-sectional, side, elevation view of a piston assembly constructed in accordance with the teachings of the present invention disposed within a cylinder;

FIG. 2 is a schematic illustration of sensing means and prime mover means which may be utilized in the construction of the shock absorber.

BEST MODE FOR CARRYING OUT THE INVENTION

Referring now to the drawing, a preferred form of shock absorber constructed in accordance with the teachings of the present invention is illustrated. The shock absorber includes a cylinder 10 filled with fluid as is conventional. A piston assembly including a piston 12 and a piston rod 18 is mounted within the interior of the cylinder. The piston 12 defines a first chamber 14 on one side of the piston and a second chamber 16 on the other side thereof. It will be appreciated that cylinder 10 is adapted to be fixed to one member of a vehicle (not shown) while the piston rod 18 is adapted to be affixed to another, relatively moveable member. For example, the cylinder could be fixed to an unsprung member such as a suspension arm and the piston rod fixed to a sprung member such as a chassis frame.

Piston 12 includes a first piston element 20 and a second piston element 22. First piston element 20 defines a cylindrically-shaped recess 24 within which the second piston element 22 is slidably disposed in fluid-tight fashion. Suitable means such as an annular stop 26 attached to piston element 20 and projecting into recess 24 is employed to maintain piston element 22 within the recess. A coil compression spring 30 is positioned above second piston element 22 and bears against first piston element 20 at the top of the recess to continually urge second piston element 22 in the direction of first chamber 14.

First and second piston elements 20, 22 thus define a space 32 within which spring 30 is disposed. Space 32 is filled with the same fluid occupying the interior of cylinder 10.

Throughbores 34 and 35 are formed in first piston element 20, said throughbores leading from space 32 to second chamber 16. Check valve means is incorporated in the piston. The check valve means includes a ring-shaped valve member 38 urged upwardly against first piston element 20 by a leaf spring 42. The spring 42 biases valve member 38 so that throughbores 34, 35 are closed unless the pressure of fluid in second chamber 16 exceeds that in first chamber 14 to a predetermined degree. A plate 43 threadedly secured to a threaded boss at the lower end of the piston rod retains spring 42 and valve member 38 in operative position. It will be appreciated that the check valve means is a one way valve, permitting passage of fluid through throughbores 34, 35 only when the fluid within chamber 16 is sufficiently pressurized to dislodge valve member 38 from the position illustrated. This only occurs when piston 12 is moving in the direction of second chamber 16.

A vent 46 is formed in piston rod 18. The vent, which includes primary vent segment 47 and secondary vent segments 49 branching therefrom, is always in communication with space 32 regardless of the direction of movement of piston 12 within cylinder 10. When the size of space 32 is lessened by second piston element 22 moving further into recess 24, fluid within the space will be vented through vent 46 into second chamber 16.

A primary passageway is formed in piston 12. In the embodiment illustrated, the primary passageway has two components. The first component is defined by first piston element 20. Specifically, the first component includes a groove 54 formed about the periphery of recess 24 and channels 56, 57 leading from the groove through the first piston element 20 to second chamber 16.

The other component of the primary passageway comprises flow paths 58 formed in second piston element 22, leading from the bottom thereof toward and into communication with groove 54.

When the second piston element 22 abuts annular stop 26, that is, when the size of space 32 is at its maximum, as shown in FIG. 1, the effective size of the primary passageway is at its maximum. When, however, second piston element 22 moves within recess 24 in the direction of second chamber 16, the effective size of the primary passageway will be reduced because groove 54 will be in registry with an increasingly smaller area of each flow path 58.

The operation of the aforedescribed structure is as follows. Under normal conditions, that is, when low damping is desired, any downward movement of piston 12 within cylinder 10 will be relatively slow. Fluid in first chamber 14 will pass in unrestricted fashion through the primary passageway to second chamber 16 with the effective size of the primary passageway being at its maximum. This is the mode or condition illustrated in FIG. 1.

If, however, the vehicle with which the shock absorber is utilized encounters a road condition resulting in rapid movement of piston 12 in the direction of first chamber 14, a greater pressure will build up in first chamber 14, and such pressure will force second piston element 22 in the direction of second chamber 16 against the urging of spring 30. The rate at which this occurs will be controlled due to the fact that fluid within space 32 must exit through vent 46 to chamber 16 when the size of space 32 diminishes. As space 32 diminishes in size, flow paths 58 will be displaced relative to groove 54 and an increasingly smaller area of each flow path will be in registry with the groove the further second piston element 22 moves into recess 24. Because the effective size of the primary passageway is diminished by this action, the piston will encounter greater resistance and a damping characteristic of greater magnitude will result.

It will be appreciated that the size of vent 46 not only controls the rate at which fluid exits space 32 but also the rate at which the space diminishes in size as well as the rate of change of the effective size of the primary passageway.

The arrangement illustrated incorporates means for selectively changing the effective size of vent 46 to control both the rate of fluid flow through the vent and the rate of space size reduction whereby the rate of change of the damping characteristics of the shock absorber can be selectively varied.

In particular, the shock absorber includes an adjustable valve means 70 which includes a valve element 72 at a lower end thereof. Valve element 72 may be introduced into a portion of vent 46 so as to restrict flow of fluid therethrough from space 32. Valve means 70 also includes a threaded element adjustably rotatably movable relative to threads formed in the piston rod. Rotation of valve means 70 in a first direction causes introduction of element 72 into vent 46, while rotation of the valve means in an opposite direction causes withdrawal of element 72 from vent 46.

When a high force is exerted onto piston rod 18, so as to drive it in a direction toward chamber 14, second piston element 22 is driven upward within recess 24 so as to pressurize hydraulic fluid in space 32. Rotation of valve means 70 so as to restrict flow of fluid through vent 46 is effective to slow movement of second piston element 22 within recess 24. Therefore, the effective cross-sectional area of the primary passageway is reduced relatively slowly and the transition of the damping of the shock absorber from relatively low damping to relatively high damping is relatively slow.

Rotation of valve means 70 in the opposite direction, however, so as to withdraw element 72 from vent 46 and permit greater flow therethrough from space 32, facilitates faster movement of piston element 22 within recess 24. A relatively fast transition of the damping of the shock absorber from relatively low to relatively high damping then takes place.

Referring now also to FIG. 2, according to an alternative embodiment of the invention, valve element 72 (FIG. 1) can be in operative association with a solenoid 80 (illustrated schematically) rather than with a threaded element. A pressure sensor 82 is operatively associated with the solenoid. Pressure sensor 82, as shown schematically, may comprise a pair of plates 84 spaced apart by spring-biasing means 86. Each plate has an electrical contact 88 mounted thereon, the contacts being arranged to become engaged when at least a predetermined minimum pressure is imposed on the sensor.

Valve element 72 is normally maintained by solenoid 80 in a position substantially restricting flow through vent 46. As contact between the contacts 88 is made and sustained, such as may be brought about by a high impact on the shock absorber, a signal is sent to solenoid apparatus 80 to disengage valve element 72 from vent 46. This facilitates substantially unrestricted flow of fluid through the vent so as to accelerate the rate of transition of the shock absorber from relatively low damping to relatively high damping. As stated, in the absence of such a signal from pressure sensor 82, vent is kept highly restricted.

It will thus be appreciated that in the embodiment of FIG. 1, the closure of vent 46 is performed manually and adjustment cannot be carried out while the shock absorber is in operation. However, the embodiment of the invention utilizing solenoid apparatus 80 provides for adjustment of the rate of transition of the damping characteristic of the shock absorber in "mid-motion".

Other approaches for automatically actuating the solenoid may be utilized. For example, an accelerometer placed on the body of a vehicle with which the shock absorber is associated may be used to initiate movement of the solenoid to stiffen or otherwise modify the damping characteristic of the shock absorber.

The pressure sensor 82 may be located at any suitable location in the shock absorber where the pressure in the first chamber may be sensed, for example, in the first chamber itself or in a shock absorber part in communication with the interior of the first chamber. The sensor may be disposed in a closed diaphragm or other suitable housing to isolate the sensor from the hydraulic fluid.

After the shock is encountered and a rebound of piston 12 in the direction of second chamber 16 takes place, it is desirable that this recovery action be as quick as possible. This means that fluid should be allowed to flow from second chamber 16 to first chamber 14 through piston 12 as quickly as possible. When piston 12 moves in the direction of second chamber 16, valve 38 will be withdrawn from throughbores 34, 35 and second piston element 22 will quickly move back into abutment with annular stop 26. Spring 30 facilitates this return but, of course, higher fluid pressure in second chamber 16 as compared to first chamber 14 will accomplish this in any event. When piston element 22 engages stop 26, fluid will flow freely through the primary passageway.

In addition, fluid will flow from chamber 16 to chamber 14 through secondary passageways 62 formed in the piston since flap valves 64 associated with such passageways open when piston 12 moves in the direction of second chamber 16. Valves 64 were of course closed when piston 12 moved toward second chamber 14.

It will be appreciated that changes may be made to the disclosed embodiment without departing from the spirit or scope of the present invention. For example, changes may be made with respect to flow paths 58 to attain the desired results. For example, the cross-sectional shape of the flow paths 58 can be varied for particular shock absorbers to obtain desirable transition characteristics between high and low damping. As mentioned above, the solenoid may be actuated by any one of a variety of triggering devices.

It is also possible to change the position of valve element 72 from closed to open by other means. For example, it is possible to introduce external pressure from above to hold valve element 72 in closed position, and discontinue such pressure in response to an appropriate signal. It is also possible to disengage valve element 72 from its position by discontinuing pressure from a piezoelectric device, also in response to signals, as described above, arising from a sensed condition.

What is claimed is:

1. A shock absorber comprising, in combination:
   a cylinder having an interior with fluid therein;
   a piston rod;
   a piston mounted within said cylinder interior defining first and second chambers in said cylinder and a primary passageway permitting the flow of fluid from said first chamber into said second chamber as fluid is pressurized in said first chamber by movement of said piston, said piston including relatively moveable first and second piston elements defining variable-sized fluid-filled space in continuous communication with said second chamber through a fluid-flow restricting vent spaced from said primary passageway, formed in said shock absorber, and providing communication between said space and said second chamber, said first piston element being fixedly mounted relative to said piston rod, movable with said piston rod, and defining a recess, and said second piston element having a peripheral wall at least partially disposed within said recess and said second piston element being gradually displaceable relative to said first piston element toward said piston rod within said recess responsive to pressurization of fluid in said first chamber to force the fluid in said space through said fluid-flow restricting vent and into said second chamber whereby the size of said space is gradually reduced as a function of the amount of fluid forced through said fluid-flow restricting vent, said primary passageway including at least one flow path defined by said first piston element and communicating with said recess and at least one aperture defined by said second piston element in the peripheral wall thereof in communication with said flow path, relative movement of said piston elements gradually displacing said aperture relative to said flow path to gradually modify the effective size of said primary passageway in response to the gradual reduction of said space size caused by fluid pressure within said first chamber exceeding fluid pressure within said second chamber and fluid flowing through said fluid-flow restricting vent, said flow path including a groove defined by said first piston element about the periphery of said recess, said groove and said aperture being so configured as to be in continuous at least partial registry during gradual displacement of said aperture; and
   means for selectively changing the effective size of said vent to control both the rate of fluid flow through said vent and the rate of space size reduction whereby the rate of change of the dampening characteristics of said shock absorber can be selectively varied, said means for selectively changing the effective size of said vent including adjustable valve means including a valve element selectively positionable in said vent.

2. The shock absorber according to claim 1 wherein said adjustable valve means further includes a threaded element connected to said valve element and matingly engaged with threads formed in said piston assembly and adjustably rotatably moveable relative to said piston assembly threads.

3. The shock absorber according to claim 1 additionally comprising prime mover means operatively associated with said adjustable valve means for moving said valve element relative to said vent to change the effective size of said vent.

4. The shock absorber according to claim 3 additionally comprising sensing means, said sensing means being in operative association with said prime mover means and cooperable therewith to move said valve element responsive to a predetermined sensed condition.

5. The shock absorber according to claim 4 wherein said prime mover means is a solenoid connected to said valve element, said solenoid operable to move said valve element relative to said vent to increase the size of said vent when said predetermined condition is sensed.

6. The shock absorber according to claim 4 wherein said sensor means comprises a spring biased plate.

7. The shock absorber according to claim 1 wherein said piston rod at least partially defines said vent.

8. The shock absorber according to claim 7 wherein said vent includes a primary vent segment in said piston rod and having an open end located in said space, and at least one secondary vent segment in said piston rod providing fluid-flow communication between said primary vent segment and said first chamber.

9. The shock absorber of claim 8 wherein said vent includes a plurality of secondary vent segments providing fluid-flow communication between said primary vent segment and said first chamber.

* * * * *